United States Patent
Davis et al.

(10) Patent No.: US 12,333,451 B2
(45) Date of Patent: Jun. 17, 2025

(54) INTERPRETABLE SUPERVISED ANOMALY DETECTION FOR DETERMINING REASONS FOR UNSUPERVISED ANOMALY DECISION

(71) Applicant: RSA Security LLC, Bedford, MA (US)

(72) Inventors: Sashka T. Davis, Vienna, VA (US); Alex Zaslavsky, Brookline, MA (US)

(73) Assignee: RSA Security USA, LLC, Burlington, MA (US)

(*) Notice: Subject to any disclaimer, the term of this patent is extended or adjusted under 35 U.S.C. 154(b) by 392 days.

(21) Appl. No.: 16/697,483

(22) Filed: Nov. 27, 2019

(65) Prior Publication Data
US 2021/0158193 A1    May 27, 2021

(51) Int. Cl.
*G06N 5/045*    (2023.01)
*G06N 5/046*    (2023.01)
*G06N 20/20*    (2019.01)

(52) U.S. Cl.
CPC .......... *G06N 5/045* (2013.01); *G06N 5/046* (2013.01); *G06N 20/20* (2019.01)

(58) Field of Classification Search
CPC ......... G06N 5/045; G06N 20/20; G06N 5/046
See application file for complete search history.

(56) References Cited

U.S. PATENT DOCUMENTS

| 2018/0248905 A1* | 8/2018 | Côté | G06N 3/08 |
| 2019/0273754 A1* | 9/2019 | Ting | G06N 3/088 |
| 2020/0210854 A1* | 7/2020 | Srinivasan | G06N 3/08 |
| 2022/0070196 A1* | 3/2022 | Sarkar | H04L 63/1425 |

OTHER PUBLICATIONS

Niu et al, "A Comparative Study of Credit Card Fraud Detection: Supervised versus Unsupervised", 2019, arXiv: 1904.10604v1, pp. 1-9. (Year: 2019).*

Ramakrishnan et al, "Anomaly Detection for an E-commerce Pricing Sytem", 2019, KDD '19: Proceedings of the 25th ACM SIGKDD International Conference on Knowledge Discovery & Data Mining, pp. 1917-1926. (Year: 2019).*

(Continued)

*Primary Examiner* — Alexey Shmatov
*Assistant Examiner* — Clint Mullinax
(74) *Attorney, Agent, or Firm* — Husch Blackwell LLP (57) ABSTRACT

Techniques are provided for determining reasons for unsupervised anomaly decisions. One method comprises obtaining values of predefined features associated with a remote user device; applying the predefined feature values to an unsupervised anomaly detection model that generates an unsupervised anomaly decision; applying the predefined feature values to a supervised anomaly detection model that generates a supervised anomaly decision; determining a third anomaly decision using the unsupervised anomaly decision; and determining reasons for the third anomaly decision by analyzing the supervised anomaly decision. The supervised anomaly detection model can be trained using the unsupervised anomaly decision and/or anomalous training data based on known anomalies. The third anomaly decision can be based on the supervised anomaly decision and the unsupervised anomaly decision using ensemble techniques.

14 Claims, 6 Drawing Sheets

(56) References Cited

OTHER PUBLICATIONS

Lee et al., "Athena: A Framework for Scalable Anomaly Detection in Software-Defined Networks", 2017, 47th Annual IEEE/IFIP International Conference on Dependable Systems and Networks, pp. 249-260. (Year: 2017).*
Cetin et al, "Tell Me You Fixed It: Evaluating Vulnerability Notifications via Quarantine Networks", Aug. 2019, 2019 IEEE European Symposium on Security and Privacy (EuroS&P), pp. 326-339. (Year: 2019).*
Lee et al, "Athena: A Framework for Scalable Anomaly Detection in Software-Defined Networks", 2017, 2017 47th Annual IEEE/IFIP International Conference on Dependable Systems and Networks (DSN), Denver, CO, USA, 2017, pp. 249-260. (Year: 2017).*
Niu et al, "A Comparative Study of Credit Card Fraud Detection: Supervised versus Unsupervised", 2019, arXiv:1904.10604, all pages. (Year: 2019)*
Cetin et al, "Tell Me You Fixed It: Evaluating Vulnerability Notifications via Quarantine Networks", 2019, 2019 IEEE European Symposium on Security and Privacy (EuroS&P), Stockholm, Sweden, 2019, pp. 326-339. (Year: 2019)*
Ramakrishnan et al, "Anomaly Detection for an E-commerce Pricing System", 2019, KDD '19: Proceedings of the 25th ACM SIGKDD International Conference on Knowledge Discovery & Data Mining, pp. 1917-1926. (Year: 2019)*
Jerome H. Friedman and Bogdan E. Popescu, "Predictive Learning Via Rule Ensembles," The Annals of Applied Statistics, vol. 2, No. 3, 916-54 (2008; DOI: 10.1214/07-AOAS148).
Cynthia Rudin, Stop Explaining Black Box Machine Learning Models for High Stakes Decisions and Use Interpretable Models Instead, Duke University, arXiv:1811.10154v3 [stat.ML] Sep. 22, 2019.
United States U.S. Appl. No. 16/668,705, filed Oct. 30, 2019, titled: Privacy Preserving Centralized Evaluation of Sensitive User Features for Anomaly Detection.
RSA Security, "Risk-Based Authentication," RSA Document 77387 (2019).
RSA Security, "Identity Assurance Services, RSA Identity Assurance Practice," RSA Risk and Cybersecurity Practice (2019).

\* cited by examiner

300

1. user_age <= 107 & cookie_users_14d > 0 & user_cookie_age <= -1
2. user_age > 100 & user_cookie_age <= -1 & user_ip_age <= -1
3. user_age > 107 & user_cookie_age <= -1 & user_age > 16
4. user_age <= 100 & device_age <= -1 & device_age <= -1
5. user_age <= 107 & cookie_users_14d > 0 & user_cookie_age > -1
⋮
N. user_age <= 107 & cookie_users_14d > 0 &

INTERPRETABLE SUPERVISED ANOMALY DETECTION FOR DETERMINING REASONS FOR UNSUPERVISED ANOMALY DECISION

FIELD

The field relates generally to information processing techniques, and more particularly, to techniques for anomaly detection.

BACKGROUND

Anomaly detection techniques, such as risk-based authentication, consider information, such as a geo-location, related to a transaction or an access attempt by a user and determine a corresponding anomaly score, such as a risk score, to assess whether the transaction or access attempt should be approved. Fraudulent activity in electronic transactions, for example, continues to increase. Machine learning-based anomaly detection techniques have been deployed to identify anomalous activity. Meanwhile, fraudulent actors and other bad actors continue to employ increasingly advanced and evolving techniques to avoid detection.

To deal with such evasive efforts by bad actors, the machine learning-based anomaly detection solutions have become increasingly cumbersome and opaque, with little, if any, ability to provide the reasoning behind decisions of the anomaly detection algorithm. As a result, organizations may hesitate to use such machine learning-based solutions which can lead to insufficient and suboptimal security practices and/or an impaired employee or customer usability experience.

A need exists for improved techniques for anomaly detection.

SUMMARY

In one embodiment, a method comprises obtaining values of one or more predefined features associated with a remote user device; applying the values of the one or more predefined features to an unsupervised anomaly detection model that generates an unsupervised anomaly decision; applying the values of the one or more predefined features to a supervised anomaly detection model that generates a supervised anomaly decision; determining a third anomaly decision based at least in part on the unsupervised anomaly decision; and determining one or more reasons for the third anomaly decision by analyzing the supervised anomaly decision.

In some embodiments, the supervised anomaly detection model is trained at least in part using one or more of the unsupervised anomaly decision and anomalous training data based on known anomalies. In at least one embodiment, the third anomaly decision is further based at least in part on the supervised anomaly decision with the unsupervised anomaly decision using ensemble techniques.

One or more embodiments obtain feedback from a human analyst indicating one or more reasons for the third anomaly decision.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for determining reasons for unsupervised anomaly decisions.

One or more embodiments of the disclosure provide techniques for determining reasons for unsupervised anomaly decisions using interpretable supervised anomaly detection. Generally, unsupervised learning identifies previously unknown patterns in data without requiring preexisting labels. Supervised learning, on the other hand, is a machine learning task of learning a function that maps an input to an output based on example input-output pairs found in labeled training data.

In some embodiments, interpretable supervised anomaly detection is used in conjunction with unsupervised anomaly detection to determine an anomaly decision and to provide one or more reasons for the anomaly decision. The anomaly decision may indicate, for example, whether one or more predefined anomalies are present and/or a likelihood of such a predefined anomaly. The predefined anomalies may be associated, for example, with a user and/or a device of the user. The term "user" herein (and variations thereof, such as "given remote user") is intended to be broadly construed so as to encompass numerous arrangements of human, hardware, software or firmware entities, as well as combinations of such entities.

In one or more embodiments, self-supervision of an anomaly detector is provided using a machine learning approximation. In one aspect, given a first opaque machine learning (ML) algorithm that solves a given business problem (such as an unsupervised anomaly detection model (ADM)), a second interpretable and transparent ML system is provided that preserves or may even improve the performance metrics of the original algorithm (such as performance metrics including, for example, accuracy; precision/recall; TPR (true positive rate)/FPR (false positive rate); and/or FAR (false acceptance rate)/FRR (false rejection rate)) but can identify one or more reasons for a decision, such as a decision regarding the presence of anomalies. In this manner, an interpretable ML decision is provided from an otherwise opaque ML algorithm.

In another aspect, given a first opaque ML algorithm, where the internal decision logic captures proprietary knowledge that cannot or should not be shared (or otherwise exposed to users and consumers), a second interpretable and transparent ML system is provided where a second algorithm learns to approximate the original ML algorithm whose decisions (and/or the reasons for such decision) are transparent and can be exposed to any entity (e.g., users/customers). As used herein, an ML algorithm is considered opaque when decisions made by the ML algorithm cannot be easily exposed to a customer or other user (who is unaware or unfamiliar with the internal decision logic of the ML algorithm).

In one or more embodiments, ensemble learning and interpretable ML techniques in a secondary ML system are employed to identify one or more reasons for a given decision by a primary ML system. In some embodiments, techniques are provided for self-supervision and approximation in an ML system, as one opaque ML algorithm A supervises (provides both data and decisions) to another interpretable ML algorithm B until ML algorithm B learns to approximate ML algorithm A.

In another embodiment, both ML algorithms A and B are used in parallel as an ensemble to solve the problem. Instances where the algorithms disagree can be used to improve the accuracy of the ensemble (e.g., improving predictive accuracy). In addition, the parallel ML algorithms A and B provide an improved ability to explain decision (also referred to herein as interpretability).

Figure 1:
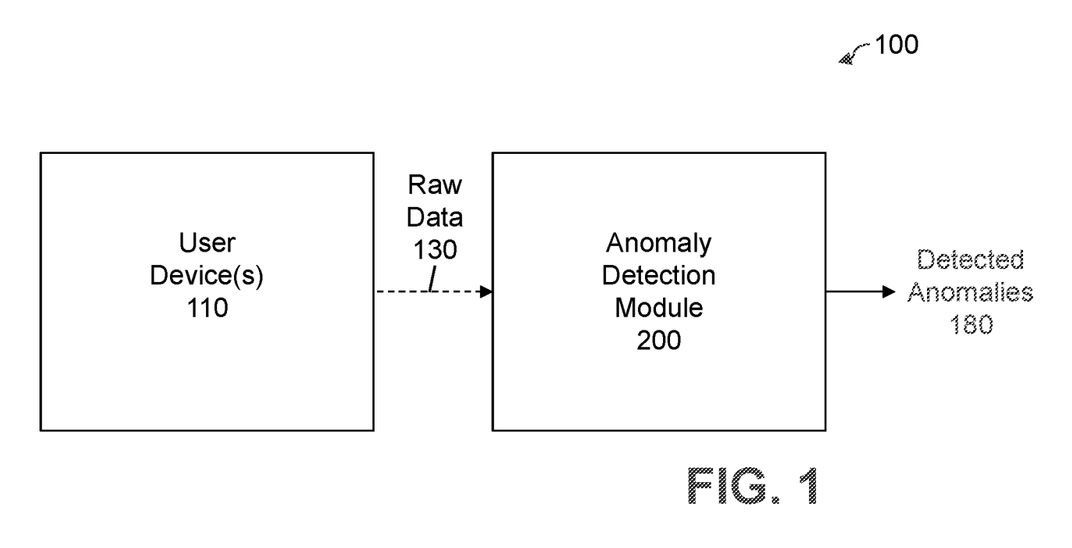
FIG. 1 illustrates an exemplary anomaly detection environment, according to some embodiments of the disclosure.

FIG. 1 illustrates an exemplary anomaly detection environment 100, according to some embodiments of the disclosure. As shown in FIG. 1, the exemplary anomaly detection environment 100 comprises one or more user devices 110 (e.g., a mobile telephone, tablet or a laptop) and one or more anomaly detection modules 200, as discussed further below in conjunction with FIG. 2, for example, in a cloud. In some embodiments, the exemplary user device 110 collects information related to, for example, the user and/or the user device 110, such as predefined contextual data and/or predefined risk facts, that can be provided to the anomaly detection module 200, for example, in the form of raw data 130. In some embodiments, the user device 110 partially processes the collected data locally, for example, by deriving the one or more feature values.

In the example of FIG. 1, the anomaly detection module 200 processes the raw data 130 and/or received feature values, to detect one or more anomalies 180 associated with the user and/or the user device 110, using machine learning and/or artificial intelligence techniques. The detected anomalies may comprise, for example, a risk anomaly, a security level anomaly, a fraud likelihood anomaly, an identity assurance anomaly, and a behavior anomaly. For a more detailed discussion of risk-based authentication, see, for example, RSA Security, "Risk-Based Authentication," RSA Document 77387 (2019), incorporated by reference herein in its entirety. For a more detailed discussion of identity assurance assessment, see, for example, RSA Security, "Identity Assurance Services, RSA Identity Assurance Practice," RSA Risk and Cybersecurity Practice (2019), incorporated by reference herein in its entirety.

In some embodiments, one or more of the raw data 130 and/or feature values can be sent by the user device 110 to the anomaly detection module 200 over an encrypted channel, as would be apparent to a person of ordinary skill in the art.

Upon detection of a predefined anomaly, the anomaly detection module 200 can optionally initiate or execute one or more predefined remedial steps and/or mitigation steps to address the detected predefined anomalies. For example, the predefined remedial steps and/or mitigation steps to address the detected predefined anomalies may comprise the transmission of an alert or alarm to the user device 110 and/or user for important or suspicious events; isolating, removing, quarantining, limiting permissions, analyzing, and deactivating one or more of the user devices 110 and/or one or more files, accounts or aspects of the user devices 110 or the user; notifying one or more third party systems (such as sending an email, or generating an alert in another system); restricting access of one or more accounts and one or more machines from accessing a network, files or folders; initiating a step-up authentication with one or more additional authentication factors; resetting or limiting permissions associated with a file or folder; quarantining one or more files or folders, and preventing one or more further actions from being executed associated with the user devices 110, user account or machine associated with the detected anomalous activity.

The user devices 110 may comprise, for example, mobile telephones, laptop computers, tablet computers, desktop computers or other types of devices capable of supporting user logins, in any combination. Such devices are examples of what are more generally referred to herein as "processing devices." Some of these processing devices are also generally referred to herein as "computers." The user devices 110 and anomaly detection module 200 of FIG. 1 can be coupled using a network (not shown), where the network is assumed to represent a sub-network or other related portion of a larger computer network.

Figure 2:
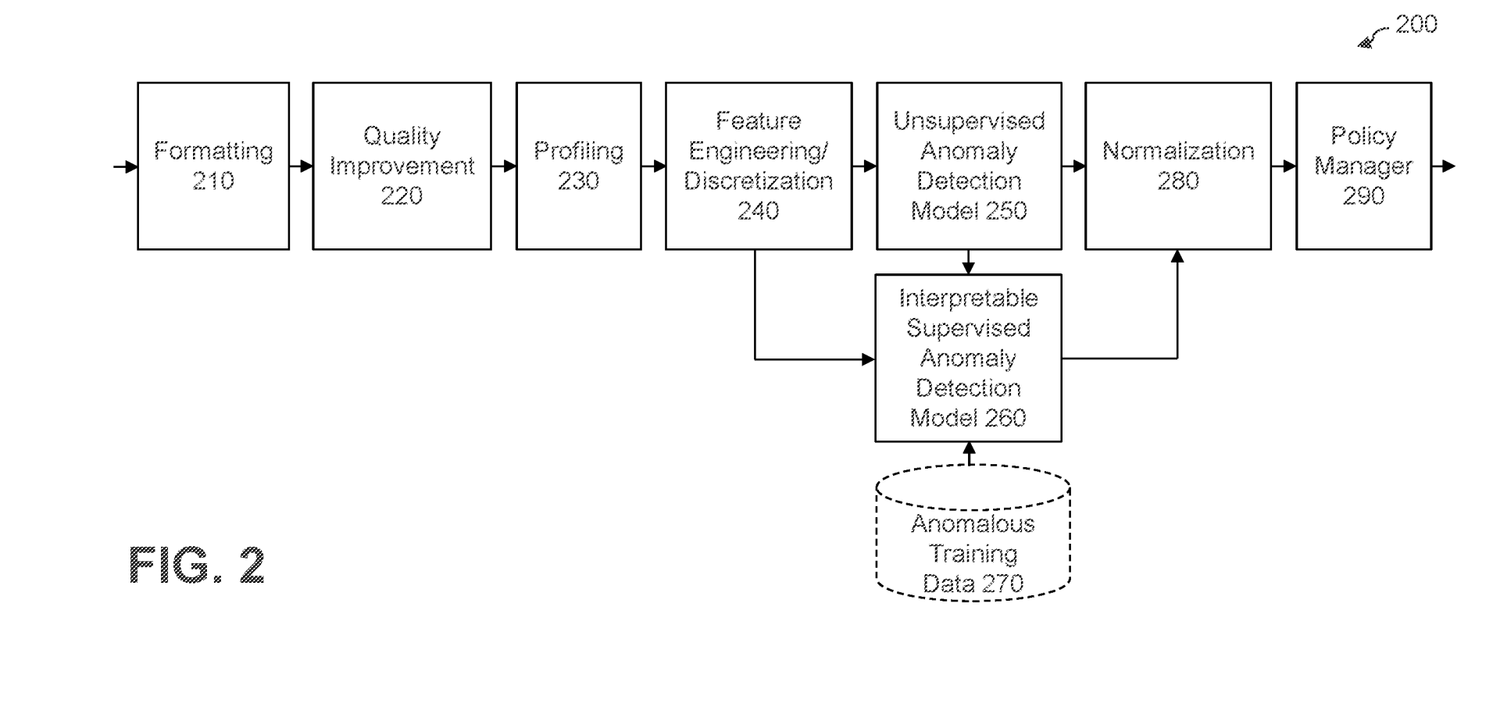
FIG. 2 illustrates the anomaly detection module of FIG. 1 in further detail, according to some embodiments of the disclosure.

FIG. 2 illustrates the anomaly detection module 200 of FIG. 1 in further detail, according to some embodiments of the disclosure. The exemplary anomaly detection module 200 may evaluate, for example, a risk model inside an identity trust engine, according to at least one embodiment. In the example of FIG. 2, the anomaly detection module 200 comprises a number of phases, such as a formatting of collected data phase 210; a data quality improvement phase 220; a profiling phase 230; a feature engineering/discretization phase 240; an anomaly detection phase (250/260), a normalization phase 280 and a policy manager 290.

It is noted that in some implementations the formatting phase 210 and data quality improvement phase 220 are optional. The outcome of each executed step may optionally be logged in a database of the anomaly detection module 200.

In some embodiments, a data normalization function phase 280 comprises applying manipulation techniques on the received raw data 130. For example, the data normalization function phase 280 might set default missing values; perform predefined numerical transformations, such as multiplication/division by constant; or perform predefined post-processing steps.

In one or more embodiments, a data enrichment, feature calculation and discretization function is often considered an important aspect of any machine learning model, as the success of the model prediction/classification is often dependent on the quality of the data and features. In some exemplary implementations, there are a number of data source types applied to the risk model, such as:

user-related information (collected directly or indirectly by the service provider);
information derived from an analysis on an organization level; and
threat intelligence.

The user-related information typically comprises sensitive user information, such as a user location, and therefore often constitutes a high risk to the privacy of each user. In a typical flow, user global positioning system (GPS) coordinates, for example, are collected by the user devices 110, and then sent to a central server, where the coordinates are mapped to corresponding Country and City values.

In some cases, it may be more efficient (detection performance-wise) to deal with categorized or discretized features rather than continuous numbers, using the discretization during phase 240. For example, a discretized feature may be a feature that represents the number of days that the user has been employed. In many implementations, the employment date is sent to the service provider and the server of the service provider makes the necessary calculation.

In the example of FIG. 2, an unsupervised anomaly detection model 250 identifies previously unknown patterns in data to perform anomaly detection, without requiring preexisting labels, in a known manner. Once an event is flagged as anomalous by a typical anomaly detection model 250, the customer/user does not know the reason for the decision. For example, the exemplary unsupervised anomaly detection model 250 may be built using a representation of the logic of subject-matter experts, typically analyzing tens of multi-dimensional features. In some embodiments, the exemplary unsupervised anomaly detection model 250 responds with a score that represents a confidence that the model has in the evaluated access request or transaction. As noted above, even when the anomaly detection model is accurate, reasons are not provided for certain anomaly detection model decisions.

In addition, one or more embodiments of the disclosure provide an interpretable supervised anomaly detection model 260 that has been trained using labeled anomalous training data 270 and provides an ability to explain anomaly decisions of the unsupervised anomaly detection model 250 (and thereby reduce the opaqueness of the unsupervised anomaly detection model 250), as discussed further below. The training phase tunes the model parameters of the interpretable supervised anomaly detection model 260 and learns the weights of various features employed by the interpretable supervised anomaly detection model 260.

The labeled anomalous training data 270 may be supplemented, for example, by generating attacks (e.g., impersonations and/or frauds) to supplement the markings for the supervised model learning. For example, the labeled anomalous training data 270 may be supplemented when the labeled anomalous training data 270 does not sufficiently cover real-world attack scenarios (e.g., which may cause the interpretable supervised anomaly detection model 260 to learn only the patterns that were determined by the provided labels, which may impair performance of the supervised model).

The policy manager 290 combines an anomaly score from one or more of the unsupervised anomaly detection model 250 and the interpretable supervised anomaly detection model 260, optionally with some features, to decide if an anomaly is present in a transaction or user access attempt.

In addition, the interpretable supervised anomaly detection model 260 enables a determination one or more reasons for an anomaly decision of the unsupervised anomaly detection model 250 by analyzing an anomaly decision of the interpretable supervised anomaly detection model 260. The reasons and/or explanations can be, for example, in the form of rules that are violated or features that are "abnormal" or instances that are similar to other known-anomalous systems.

In this manner, the disclosed techniques for determining reasons for unsupervised anomaly decisions combines two separate ML components 250, 260. In addition to the custom-designed unsupervised anomaly detection model 250, the interpretable supervised anomaly detection model 260 acts in parallel with the existing unsupervised anomaly detection model 250. A final anomaly decision can be based on the decisions of the unsupervised anomaly detection model 250 and/or the interpretable supervised anomaly detection model 260. For example, the two decisions from the unsupervised anomaly detection model 250 and the interpretable supervised anomaly detection model 260 can be combined using ensemble techniques into a single result (in addition to using the anomaly decision of the interpretable supervised anomaly detection model 260 to determine one or more reasons for the anomaly decision of the unsupervised anomaly detection model 250 using the disclosed techniques).

In this manner, an ensemble classifier is optionally provided in some embodiments that combines the decisions of the unsupervised anomaly detection model 250 and the interpretable supervised anomaly detection model 260 into a single decision for improved detection. The independent decisions of the unsupervised anomaly detection model 250 and the interpretable supervised anomaly detection model 260 are combined into a single decision to improve the anomaly detection. A generalized linear model is trained, where each of the unsupervised anomaly detection model 250 and the interpretable supervised anomaly detection model 260 are assigned a constant based on their individual predictive powers to create a new solution to the identity problem, for example.

In some embodiments, when the anomaly decision of the interpretable supervised anomaly detection model 260 is different from the anomaly decision of the unsupervised anomaly detection model 250, data can be collected where the two decisions disagree. The collected data can be used to build a "super" ensemble of the two algorithms that improves the overall accuracy. For example, the unsupervised anomaly detection model 250 and the interpretable supervised anomaly detection model 260 can be treated as black boxes and "weak" learners, and coefficients can be estimated that combine the anomaly decisions of the two weak learners using boosting techniques.

Among other benefits, the interpretable supervised anomaly detection model 260 captures subject-matter expertise and knowledge of the reasons for anomaly decisions. As noted above, a typical unsupervised anomaly detection model 250 does not provide reasons for the generated anomaly decisions (e.g., when an event is flagged as an anomaly).

In some embodiments, the interpretable supervised anomaly detection model 260 is bootstrapped to learn to approximate the "black box" unsupervised anomaly detection model 250 until a performance of the unsupervised anomaly detection model 250 satisfies one or more predefined performance criteria. The combination of the unsupervised anomaly detection model 250 and the interpretable supervised anomaly detection model 260 provides:

accurate results (for example, based on one or more measures: precision/recall, TPR/FPR, FAR/FRR); and     model interpretability that provides an explanation of the anomaly decision of the unsupervised anomaly detection model 250 (for example, if an event is flagged as anomalous, the anomaly detection module 200 provides reasons and rules that are violated to justify the decision of the anomaly detection module 200 to a user or consumer).

The interpretable supervised anomaly detection model 260 may be implemented, for example, using a rule-based model, such as a RuleFit algorithm, that trains a set of short (low-depth) decision trees to induce a weighted set of short-width decision rules. See, for example, Jerome H. Friedman and Bogdan E. Popescu, "Predictive Learning Via Rule Ensembles," The Annals of Applied Statistics, Vol. 2, No. 3, 916-54 (2008; DOI: 10.1214/07-AOAS148), incorporated by reference herein in its entirety. Generally, the RuleFit algorithm learns short but interpretable rules that can be used in accordance with the disclosed techniques to supplement the anomaly detection model in the unsupervised anomaly detection model 250. RuleFit uses boosting, gradient descent, and CART decision trees to learn a linear combination of rules. In at least some embodiments, each feature in a given rule is combined using a logical AND operation of arithmetic conditions.

The output of the learning algorithm is a set of rules with an associated weight, as discussed further below in conjunction with FIG. 4. The magnitude of the weight often indicates the importance of the rule. The decision rules are interpretable because they are logical AND operations of arithmetic conditions (e.g., for numerical data) or set membership (e.g., for categorical data). A weighted ensemble of rules provides transparency and interpretability to the user and/or consumer and explains the reasons for the decisions of the unsupervised anomaly detection model 250. The reasons for the anomaly decision may comprise, for example, (i) identifying one or more violated rules of the rule-based model, and/or (ii) identifying one or more violated features of one or more violated rules of the rule-based model.

In another variation, the interpretable supervised anomaly detection model 260 may be implemented, for example, using a nearest neighbor model. The values of one or more predefined features associated with a remote user device are assigned to a substantially closest data point in the nearest neighbor model. The reasons for the anomaly decision may comprise, for example, identifying an anomaly type of the substantially closest data point in the nearest neighbor model.

In yet another variation, the interpretable supervised anomaly detection model 260 may be implemented, for example, using a logistic regression classifier model. The reasons for the anomaly decision may comprise, for example, identifying one or more predefined features associated with a remote user device that contributed to the supervised anomaly decision.

In an additional or alternative variation, the interpretable supervised anomaly detection model 260 may be implemented, for example, using a Naive Bayes classifier model that estimates a first likelihood of an anomaly class and a second likelihood of a no anomaly class given each of the predefined features. The reasons for the anomaly decision may comprise, for example, identifying one or more predefined features associated with a remote user device that contributed to the first likelihood and/or the second likelihood.

Figure 3:
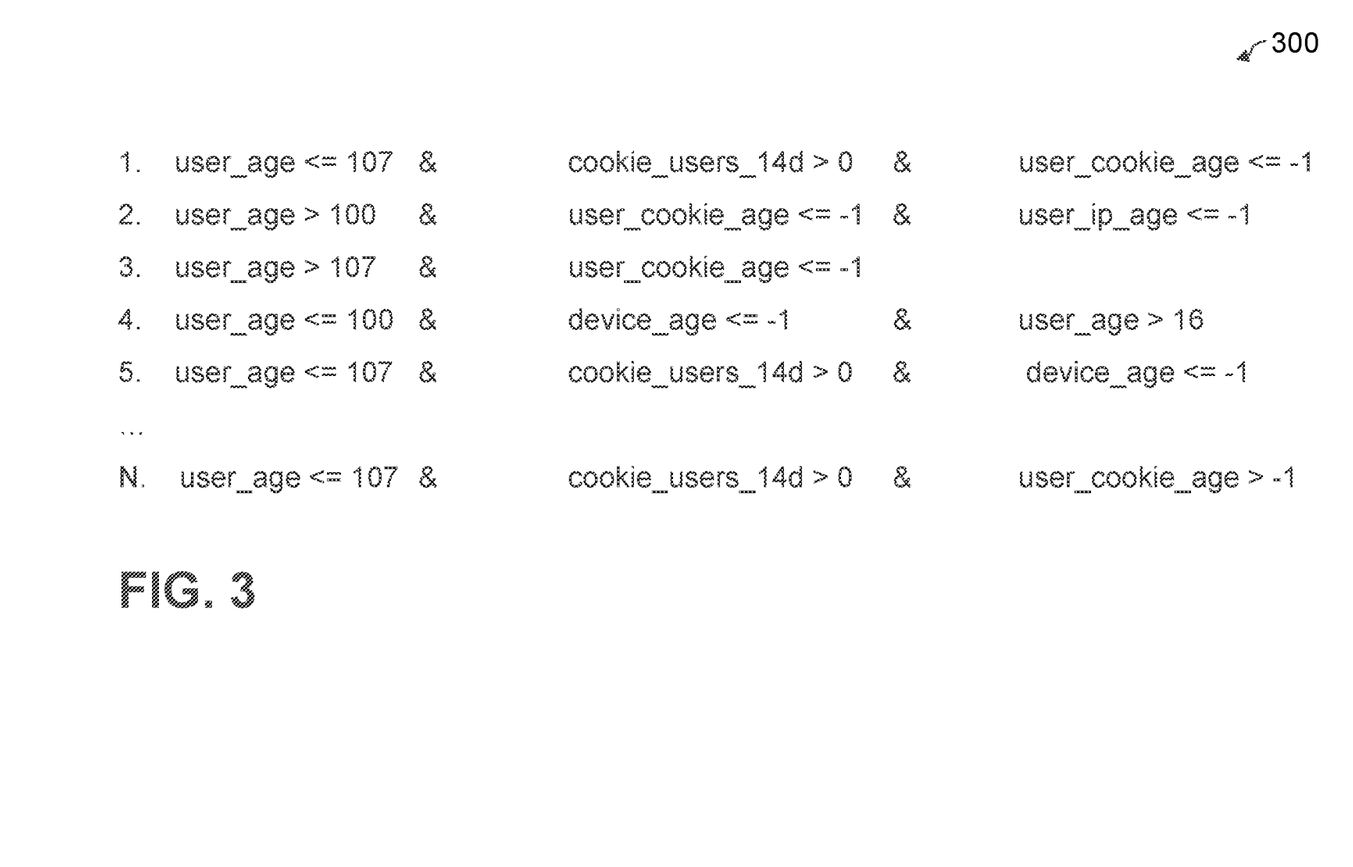
FIG. 3 illustrates an exemplary set of anomaly detection rules that may be used by the interpretable supervised anomaly detection model of FIG. 2, according to an embodiment.

FIG. 3 illustrates an exemplary set of anomaly detection rules 300 that may be used by the interpretable supervised anomaly detection model of FIG. 2, according to an embodiment. As noted above, an exemplary RuleFit implementation of the interpretable supervised anomaly detection model 260 learns short but interpretable rules that can be used in accordance with the disclosed techniques to supplement the anomaly detection model in the unsupervised anomaly detection model 250. As shown in FIG. 3, the exemplary set of anomaly detection rules 300 comprise a linear combination of rules. In at least some embodiments, each feature in a given rule is combined using a logical AND operation of arithmetic conditions.

In some embodiments, the exemplary RuleFit implementation can be configured to build the ensemble to use rules of at most three conditions. Thus, a human can interpret the meaning of the decision of the algorithm which is expressed as a violated rule.

Figure 4:
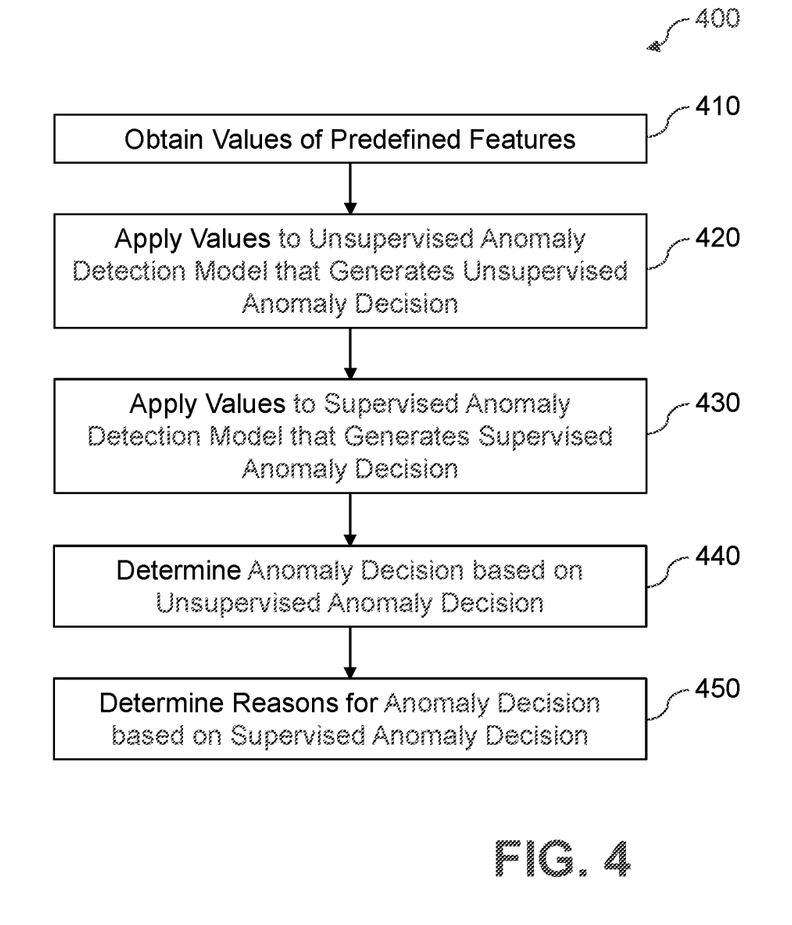
FIG. 4 is a flow chart illustrating an exemplary implementation of an interpretable anomaly detection process, according to one embodiment of the disclosure.

FIG. 4 is a flow chart illustrating an exemplary implementation of an interpretable anomaly detection process 400, according to one embodiment of the disclosure. As shown in FIG. 4, the interpretable anomaly detection process 400 initially obtains values for predefined features associated with a remote user device during step 410. The values of the predefined features are applied to an unsupervised anomaly detection model during step 420 that generates an unsupervised anomaly decision. In addition, the values of the predefined features are applied to a supervised anomaly detection model during step 430 that generates a supervised anomaly decision.

An anomaly decision is determined during step 440 based at least in part on the unsupervised anomaly decision. Finally, one or more reasons for the unsupervised anomaly decision are determined during step 450 by analyzing the supervised anomaly decision.

The disclosed techniques for determining reasons for unsupervised anomaly decisions can be leveraged to perform a feature importance analysis (e.g., identifying the variables that are most predictive), to measure feature interaction and/or to learn identify the features having high predictive accuracy for future feature engineering). For example, the ensemble can learn if two, three or more variables are involved in complex dependence and interaction. Feature importance and interaction analysis with the interpretable supervised anomaly detection model 260 if customer data is available can help provide insights to augment the unsupervised anomaly detection model 250 (if needed). For example, given labelled data from a customer or attacks (e.g., where all datapoints are a feature vector), important features can be identified using statistical techniques, such as user age or user cookie age. Generally, the features that appear in the rules of a rule-based implementation tend to be more important.

Among other benefits, the disclosed techniques for determining reasons for an unsupervised anomaly decision using an interpretable supervised anomaly detection model captures subject-matter expertise and knowledge of the reasons for anomaly decisions. As noted above, a typical unsupervised anomaly detection model does not provide reasons for the generated anomaly decisions (e.g., when an event is flagged as an anomaly).

In some embodiments, the disclosed techniques for determining reasons for unsupervised anomaly decisions thus allows a user or administrator to learn reasons for anomaly decisions made by the unsupervised anomaly detection model 250.

One or more embodiments of the disclosure provide improved methods, apparatus and computer program products for determining reasons for unsupervised anomaly decisions. The foregoing applications and associated embodiments should be considered as illustrative only, and numerous other embodiments can be configured using the techniques disclosed herein, in a wide variety of different applications.

It should also be understood that the disclosed techniques for determining reasons for unsupervised anomaly decisions, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for determining reasons for unsupervised anomaly decisions may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based interpretable anomaly detection engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based interpretable anomaly detection platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
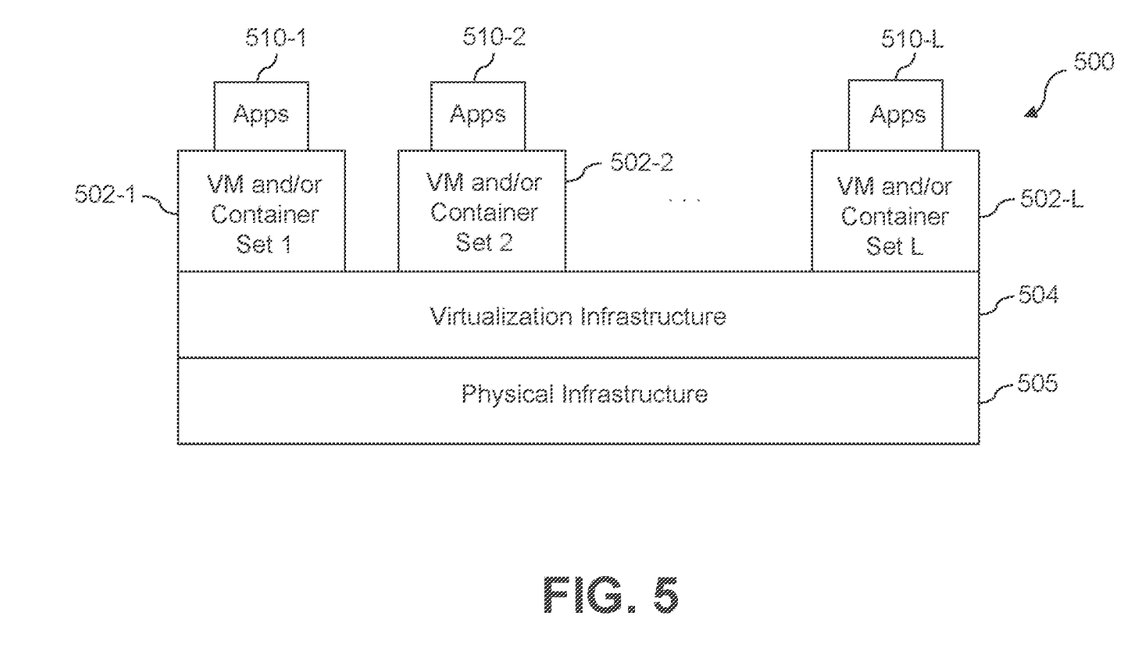
FIG. 5 illustrates an exemplary processing platform that may be used to implement at least a portion of one or more embodiments of the disclosure comprising a cloud infrastructure.

FIG. 5 shows an example processing platform comprising cloud infrastructure 500. The cloud infrastructure 500 comprises a combination of physical and virtual processing resources that may be utilized to implement at least a portion of an information processing system. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide anomaly detection functionality of the type described above for one or more processes running on a given one of the VMs. For example, each of the VMs can implement unsupervised anomaly detection control logic and associated interpretable supervised anomaly detection techniques for providing reasons for unsupervised anomaly decisions for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide anomaly detection functionality of the type described above for one or more processes running on different ones of the containers. For example, a container host device supporting multiple containers of one or more container sets can implement one or more instances of unsupervised anomaly detection control logic and associated interpretable supervised anomaly detection techniques for providing reasons for unsupervised anomaly decisions.

As is apparent from the above, one or more of the processing modules or other components of anomaly detection environment 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises at least a portion of the given system and includes a plurality of processing devices, denoted 602-1, 602-2, 602-3, ... 602-K, which communicate with one another over a network 604. The network 604 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an application specific integrated circuit (ASIC), a field programmable gate array (FPGA) or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Figure 6:
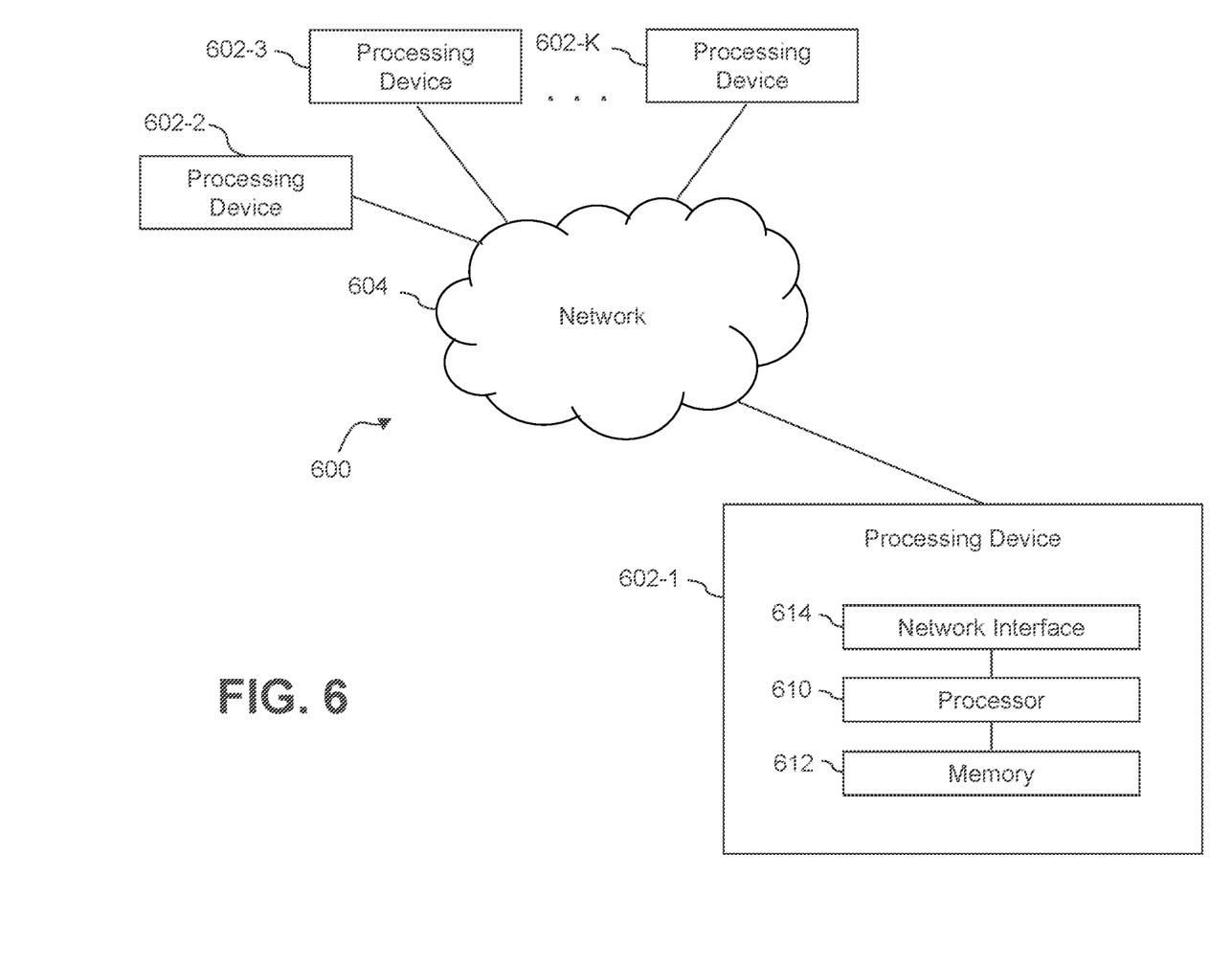
FIG. 6 illustrates another exemplary processing platform that may be used to implement at least a portion of one or more embodiments of the disclosure.

Multiple elements of an information processing system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   receiving at a network monitoring device implemented by a cloud infrastructure values of one or more predefined features associated with a remote user device that is separate from the cloud infrastructure;
   applying the values of the one or more predefined features to an unsupervised anomaly detection model that generates an unsupervised anomaly decision by identifying at least one previously-unknown pattern in the values of the one or more features associated with the remote user device;
   applying the values of the one or more predefined features to a supervised anomaly detection model that generates a supervised anomaly decision based on at least one input-output pair in a labeled training dataset, wherein the supervised anomaly detection model is trained at least in part using anomalous training data based on known anomalies and supplemental training data that includes generated fraudulent attacks that are under-represented in the anomalous training data;
   determining a third anomaly decision based on the supervised anomaly decision with the unsupervised anomaly decision using ensemble techniques;
   determining one or more reasons for the third anomaly decision by analyzing the supervised anomaly decision to identify one or more instances in which a value associated with a feature violated a rule of the supervised anomaly detection model, executing a predefined remediation step in response to the third anomaly decision, wherein the predefined remediation step includes restricting the remote user device from accessing a network in response to the third anomaly decision by autonomously adjusting a network permission that controls which resources the remote user device and a user account associated with the remote user device may access; and performing a feature importance analysis to identify one or more features that are most predictive in detecting an anomaly for a future anomaly detection instance, wherein the feature importance analysis includes a feature interaction analysis to identify two or more features that have a dependency relationship;

wherein the method is performed by at least one processing device comprising a processor coupled to a memory.

2. The method of claim 1, wherein a decision logic of the unsupervised anomaly detection model is not exposed to a user.

3. The method of claim 1, wherein the supervised anomaly detection model is trained at least in part using the unsupervised anomaly decision.

4. The method of claim 1, wherein the supervised anomaly detection model comprises a nearest neighbor model and wherein the values of the one or more predefined features associated with the remote user device are assigned to a substantially closest data point in the nearest neighbor model, and wherein the determining the one or more reasons for the third anomaly decision comprises identifying an anomaly type of the substantially closest data point in the nearest neighbor model.

5. The method of claim 1, wherein the supervised anomaly detection model comprises a logistic regression classifier model and the determining the one or more reasons for the third anomaly decision comprises identifying one or more of the predefined features associated with the remote user device that contributed to the supervised anomaly decision.

6. The method of claim 1, wherein the supervised anomaly detection model comprises a Naive Bayes classifier model that estimates a first likelihood of an anomalous class and a second likelihood of a non-anomalous class given each of the predefined features and the determining the one or more reasons for the third anomaly decision comprises identifying one or more of the predefined features associated with the remote user device that contributed to one or more of the first likelihood and the second likelihood.

7. The method of claim 1, further comprising assigning an importance to one or more of the predefined features based on features appearing in the supervised anomaly detection model.

8. The method of claim 1, wherein the third anomaly decision is used to detect one or more predefined anomalies comprising one or more of a risk anomaly, a security level anomaly, a fraud likelihood anomaly, an identity assurance anomaly, and a behavior anomaly.

9. The method of claim 1, further comprising obtaining feedback from a human analyst indicating one or more reasons for the third anomaly decision.

10. An apparatus comprising:
at least one processing device comprising a processor coupled to a memory; the at least one processing device being configured to implement the following steps:
receiving at a network monitoring device implemented by a cloud infrastructure values of one or more predefined features associated with a remote user device that is separate from the cloud infrastructure;
applying the values of the one or more predefined features to an unsupervised anomaly detection model that generates an unsupervised anomaly decision by identifying at least one previously-unknown pattern in the values of the one or more features associated with the remote user device;
applying the values of the one or more predefined features to a supervised anomaly detection model that generates a supervised anomaly decision based on at least one input-output pair in a labeled training dataset, wherein the supervised anomaly detection model is trained at least in part using anomalous training data based on known anomalies and supplemental training data that includes generated fraudulent attacks that are underrepresented in the anomalous training data;
determining a third anomaly decision based on the supervised anomaly decision with the unsupervised anomaly decision using ensemble techniques;
determining one or more reasons for the third anomaly decision by analyzing the supervised anomaly decision to identify one or more instances in which a value associated with a feature violated a rule of the supervised anomaly detection model;
performing a feature importance analysis to identify one or more features that are most predictive in detecting an anomaly for a future anomaly detection instance, wherein the feature importance analysis includes a feature interaction analysis to identify two or more features that have a dependency relationship;
executing a predefined remediation step in response to the third anomaly decision, wherein the predefined remediation step includes restricting the remote user device from accessing a network in response to the third anomaly decision by autonomously adjusting a network permission that controls which resources the remote user device may access and by quarantining one or more files associated with the user device from the network.

11. The apparatus of claim 10, wherein the supervised anomaly detection model is trained at least in part using one or more of the unsupervised anomaly decision and anomalous training data based on known anomalies.

12. The apparatus of claim 10, further comprising obtaining feedback from a human analyst indicating one or more reasons for the third anomaly decision.

13. A non-transitory processor-readable storage medium having stored therein program code of one or more software programs, wherein the program code when executed by at least one processing device causes the at least one processing device to perform the following steps:
receiving at a network monitoring device implemented by a cloud infrastructure values of one or more predefined features associated with a remote user device that is separate from the cloud infrastructure;
applying the values of the one or more predefined features to an unsupervised anomaly detection model that generates an unsupervised anomaly decision by identifying at least one previously-unknown pattern in the values of the one or more features associated with the remote user device;
applying the values of the one or more predefined features to a supervised anomaly detection model that generates a supervised anomaly decision based on at least one input-output pair in a labeled training dataset, wherein the supervised anomaly detection model is trained at least in part using anomalous training data based on known anomalies and supplemental training data that includes generated fraudulent attacks that are underrepresented in the anomalous training data;

determining a third anomaly decision based on the supervised anomaly decision with the unsupervised anomaly decision using ensemble techniques;

determining one or more reasons for the third anomaly decision by analyzing the supervised anomaly decision to identify one or more instances in which a value associated with a feature violated a rule of the supervised anomaly detection model;

performing a feature importance analysis to identify one or more features that are most predictive in detecting an anomaly for a future anomaly detection instance, wherein the feature importance analysis includes a feature interaction analysis to identify two or more features that have a dependency relationship;

executing a predefined remediation step in response to the third anomaly decision, wherein the predefined remediation step includes restricting the remote user device from accessing a network in response to the third anomaly decision by autonomously adjusting a network permission that controls which resources the remote user device may access and by deactivating a user account associated with the remote user device.

14. The non-transitory processor-readable storage medium of claim 13, wherein the supervised anomaly detection model is trained at least in part using one or more of the unsupervised anomaly decision.

* * * * *